United States Patent
Chavez Vargas et al.

(10) Patent No.: US 12,508,399 B2
(45) Date of Patent: Dec. 30, 2025

(54) MANUFACTURE OF STEERABLE DELIVERY DEVICES

(71) Applicant: Edwards Lifesciences Corporation, Irvine, CA (US)

(72) Inventors: Carlos Chavez Vargas, Lake Forest, CA (US); Luis Molina, Corona, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 982 days.

(21) Appl. No.: 17/408,670

(22) Filed: Aug. 23, 2021

(65) Prior Publication Data

US 2021/0379335 A1 Dec. 9, 2021

Related U.S. Application Data

(63) Continuation of application No. PCT/US2020/016935, filed on Feb. 6, 2020.

(60) Provisional application No. 62/809,894, filed on Feb. 25, 2019.

(51) Int. Cl.
*A61M 25/01* (2006.01)
*A61M 25/00* (2006.01)
*B21F 3/02* (2006.01)

(52) U.S. Cl.
CPC .... *A61M 25/0147* (2013.01); *A61M 25/0009* (2013.01); *B21F 3/02* (2013.01); *A61M 2025/015* (2013.01)

(58) Field of Classification Search
CPC .......... A61M 25/0147; A61M 25/0009; A61M 2025/015; A61M 25/0136; A61M 25/0133; A61M 25/0138; A61M 25/0084; A61B 1/0052; A61B 17/8685; A61N 1/3752
See application file for complete search history.

(56) References Cited

U.S. PATENT DOCUMENTS

| | | |
|---|---|---|
| 519,297 A | 5/1894 | Wanek et al. |
| 4,035,849 A | 7/1977 | Angell et al. |
| 4,592,340 A | 6/1986 | Boyles |
| 4,955,895 A | 9/1990 | Sugiyama et al. |

(Continued)

FOREIGN PATENT DOCUMENTS

| | | |
|---|---|---|
| CN | 103284786 A | 9/2013 |
| CN | 103566454 A | 2/2014 |

(Continued)

*Primary Examiner* — Michael J Tsai
*Assistant Examiner* — Neeraja Gollamudi
(74) *Attorney, Agent, or Firm* — Chang & Hale LLP (57) ABSTRACT

Steerable delivery devices use one or more pull wires. Described herein are devices and methods for securing a pull wire to an adjustment mechanism of such delivery devices. The disclosed devices facilitate securing the pull wire by using a wrapping set screw that forms a lumen for the pull wire and one or more notches in the side of the wrapping set screw at its proximal end. The notches allow the pull wire to be pulled through a notch so that when the wrapping set screw is driven into a threaded lumen the pull wire lies along the roots of the screw. The pull wire is secured in place due at least in part to friction and/or to being pressed between the screw and the threaded lumen of a wrap housing where the wrap housing can be part of the adjustment mechanism of the delivery device.

31 Claims, 6 Drawing Sheets

(56) References Cited

U.S. PATENT DOCUMENTS

| | | |
|---|---|---|
| 4,994,077 A | 2/1991 | Dobben |
| 5,059,177 A | 10/1991 | Towne et al. |
| 5,176,698 A | 1/1993 | Burns et al. |
| 5,192,297 A | 3/1993 | Hull |
| 5,195,968 A * | 3/1993 | Lundquist ......... A61M 25/0147 604/95.04 |
| 5,266,073 A | 11/1993 | Wall |
| 5,325,845 A | 7/1994 | Adair |
| 5,327,906 A | 7/1994 | Fideler |
| 5,329,923 A * | 7/1994 | Lundquist ......... A61M 25/0147 607/122 |
| 5,358,496 A | 10/1994 | Ortiz et al. |
| 5,395,329 A | 3/1995 | Fleischhacker et al. |
| 5,411,552 A | 5/1995 | Andersen et al. |
| 5,554,185 A | 9/1996 | Block et al. |
| 5,591,195 A | 1/1997 | Taheri et al. |
| 5,599,305 A | 2/1997 | Hermann et al. |
| 5,632,760 A | 5/1997 | Sheiban et al. |
| 5,639,274 A | 6/1997 | Fischell et al. |
| 5,728,068 A | 3/1998 | Leone et al. |
| 5,749,890 A | 5/1998 | Shaknovich |
| 5,782,809 A | 7/1998 | Umeno et al. |
| 5,824,044 A | 10/1998 | Quiachon et al. |
| 5,840,081 A | 11/1998 | Andersen et al. |
| 5,908,405 A | 6/1999 | Imran et al. |
| 5,916,147 A | 6/1999 | Boury |
| 5,944,690 A | 8/1999 | Falwell et al. |
| 5,961,536 A | 10/1999 | Mickley et al. |
| 5,968,068 A | 10/1999 | Dehdashtian et al. |
| 6,019,777 A | 2/2000 | Mackenzie |
| 6,027,510 A | 2/2000 | Alt |
| 6,033,381 A | 3/2000 | Kontos |
| 6,066,125 A | 5/2000 | Webster, Jr. |
| 6,143,016 A | 11/2000 | Bleam et al. |
| 6,162,208 A | 12/2000 | Hipps |
| 6,168,614 B1 | 1/2001 | Andersen et al. |
| 6,174,327 B1 | 1/2001 | Mertens et al. |
| 6,198,974 B1 | 3/2001 | Webster, Jr. |
| 6,217,585 B1 | 4/2001 | Houser et al. |
| 6,235,050 B1 | 5/2001 | Quiachon et al. |
| 6,251,092 B1 | 6/2001 | Qin et al. |
| 6,379,372 B1 | 4/2002 | Dehdashtian et al. |
| 6,383,171 B1 | 5/2002 | Gifford et al. |
| 6,454,799 B1 | 9/2002 | Schreck |
| 6,458,153 B1 | 10/2002 | Bailey et al. |
| 6,461,382 B1 | 10/2002 | Cao |
| 6,471,672 B1 | 10/2002 | Brown et al. |
| 6,500,147 B2 | 12/2002 | Omaleki et al. |
| 6,514,228 B1 | 2/2003 | Hamilton et al. |
| 6,527,979 B2 | 3/2003 | Constantz et al. |
| 6,579,305 B1 | 6/2003 | Lashinski |
| 6,582,462 B1 | 6/2003 | Andersen et al. |
| 6,652,578 B2 | 11/2003 | Bailey et al. |
| 6,730,118 B2 | 5/2004 | Spenser et al. |
| 6,733,525 B2 | 5/2004 | Yang et al. |
| 6,764,504 B2 | 7/2004 | Wang et al. |
| 6,767,362 B2 | 7/2004 | Schreck |
| 6,830,584 B1 | 12/2004 | Seguin |
| 6,893,460 B2 | 5/2005 | Spenser et al. |
| 6,908,481 B2 | 6/2005 | Cribier |
| 7,011,094 B2 | 3/2006 | Rapacki et al. |
| 7,018,406 B2 | 3/2006 | Seguin et al. |
| 7,018,408 B2 | 3/2006 | Bailey et al. |
| 7,137,993 B2 | 11/2006 | Acosta et al. |
| 7,276,084 B2 | 10/2007 | Yang et al. |
| 7,318,278 B2 | 1/2008 | Zhang et al. |
| 7,320,702 B2 | 1/2008 | Hammersmark et al. |
| 7,320,704 B2 | 1/2008 | Lashinski et al. |
| 7,374,571 B2 | 5/2008 | Pease et al. |
| 7,393,360 B2 | 7/2008 | Spenser et al. |
| 7,435,257 B2 | 10/2008 | Lashinski et al. |
| 7,510,575 B2 | 3/2009 | Spenser et al. |
| 7,585,321 B2 | 9/2009 | Cribier |
| 7,594,926 B2 | 9/2009 | Linder et al. |
| 7,597,709 B2 | 10/2009 | Goodin |
| 7,618,446 B2 | 11/2009 | Andersen et al. |
| 7,658,757 B2 | 2/2010 | Moberg et al. |
| 7,780,723 B2 | 8/2010 | Taylor |
| 7,785,366 B2 | 8/2010 | Maurer et al. |
| 7,959,661 B2 | 6/2011 | Hijlkema et al. |
| 8,029,556 B2 | 10/2011 | Rowe |
| 8,167,932 B2 | 5/2012 | Bourang et al. |
| RE43,882 E | 12/2012 | Hopkins et al. |
| 8,449,606 B2 | 5/2013 | Eliasen et al. |
| 8,475,523 B2 | 7/2013 | Duffy |
| 8,568,472 B2 | 10/2013 | Marchand et al. |
| 9,061,119 B2 | 6/2015 | Le et al. |
| 9,119,716 B2 | 9/2015 | Lee et al. |
| 9,149,607 B2 | 10/2015 | Scheibe et al. |
| 9,572,957 B2 | 2/2017 | Osypka et al. |
| 9,795,477 B2 | 10/2017 | Tran et al. |
| 11,273,038 B2 | 3/2022 | Tang et al. |
| 2001/0002445 A1 | 5/2001 | Vesely |
| 2001/0007082 A1 | 7/2001 | Dusbabek et al. |
| 2002/0032481 A1 | 3/2002 | Gabbay |
| 2002/0058995 A1 | 5/2002 | Stevens |
| 2002/0165461 A1 | 11/2002 | Hayzelden et al. |
| 2003/0040792 A1 | 2/2003 | Gabbay |
| 2003/0050694 A1 | 3/2003 | Yang et al. |
| 2003/0120341 A1 | 6/2003 | Shennib et al. |
| 2004/0093061 A1 | 5/2004 | Acosta et al. |
| 2004/0122360 A1 | 6/2004 | Waldhauser et al. |
| 2004/0133263 A1 | 7/2004 | Dusbabek et al. |
| 2004/0143197 A1 | 7/2004 | Soukup et al. |
| 2004/0186563 A1 | 9/2004 | Lobbi |
| 2004/0186565 A1 | 9/2004 | Schreck |
| 2004/0260389 A1 | 12/2004 | Case et al. |
| 2005/0080474 A1 | 4/2005 | Andreas et al. |
| 2005/0096736 A1 | 5/2005 | Osse et al. |
| 2005/0137689 A1 | 6/2005 | Salahieh et al. |
| 2005/0149160 A1 | 7/2005 | McFerran |
| 2005/0203614 A1 | 9/2005 | Forster et al. |
| 2005/0203617 A1 | 9/2005 | Forster et al. |
| 2005/0245894 A1 | 11/2005 | Azizi |
| 2006/0025857 A1 | 2/2006 | Bergheim et al. |
| 2006/0282150 A1 | 12/2006 | Olson et al. |
| 2007/0005131 A1 | 1/2007 | Taylor |
| 2007/0010801 A1 * | 1/2007 | Chen ............... A61M 25/0147 606/1 |
| 2007/0073389 A1 | 3/2007 | Bolduc et al. |
| 2007/0088431 A1 | 4/2007 | Bourang et al. |
| 2007/0100356 A1 | 5/2007 | Lucatero et al. |
| 2007/0112422 A1 | 5/2007 | Dehdashtian |
| 2007/0203575 A1 | 8/2007 | Forster et al. |
| 2007/0219612 A1 | 9/2007 | Andreas et al. |
| 2007/0239254 A1 | 10/2007 | Chia et al. |
| 2007/0244546 A1 | 10/2007 | Francis |
| 2007/0265700 A1 | 11/2007 | Eliasen et al. |
| 2008/0065011 A1 | 3/2008 | Marchand et al. |
| 2008/0103520 A1 | 5/2008 | Selkee |
| 2008/0125853 A1 | 5/2008 | Bailey et al. |
| 2008/0294230 A1 | 11/2008 | Parker |
| 2009/0024428 A1 | 1/2009 | Hudock |
| 2009/0069889 A1 | 3/2009 | Suri et al. |
| 2009/0138079 A1 | 5/2009 | Tuval et al. |
| 2009/0157175 A1 | 6/2009 | Benichou |
| 2009/0192585 A1 | 7/2009 | Bloom et al. |
| 2009/0228093 A1 | 9/2009 | Taylor et al. |
| 2009/0276040 A1 | 11/2009 | Rowe et al. |
| 2009/0281619 A1 | 11/2009 | Le et al. |
| 2009/0299456 A1 | 12/2009 | Melsheimer |
| 2009/0319037 A1 | 12/2009 | Rowe et al. |
| 2010/0030318 A1 | 2/2010 | Berra |
| 2010/0036472 A1 | 2/2010 | Papp |
| 2010/0036473 A1 | 2/2010 | Roth |
| 2010/0049313 A1 | 2/2010 | Alon et al. |
| 2010/0076402 A1 | 3/2010 | Mazzone et al. |
| 2010/0076541 A1 | 3/2010 | Kumoyama |
| 2010/0082089 A1 | 4/2010 | Quadri et al. |
| 2010/0094394 A1 | 4/2010 | Beach et al. |
| 2010/0121425 A1 | 5/2010 | Shimada |
| 2010/0145431 A1 | 6/2010 | Wu et al. |
| 2010/0161036 A1 | 6/2010 | Pintor et al. |
| 2010/0174363 A1 | 7/2010 | Castro |

(56) References Cited

U.S. PATENT DOCUMENTS

| | | |
|---|---|---|
| 2010/0198347 A1 | 8/2010 | Zakay et al. |
| 2010/0274344 A1 | 10/2010 | Dusbabek et al. |
| 2011/0015729 A1 | 1/2011 | Jimenez et al. |
| 2011/0054287 A1* | 3/2011 | Schultz ............... A61B 18/082 604/95.04 |
| 2011/0054596 A1 | 3/2011 | Taylor |
| 2011/0137331 A1 | 6/2011 | Walsh et al. |
| 2011/0160846 A1 | 6/2011 | Bishop et al. |
| 2012/0123529 A1 | 5/2012 | Levi et al. |
| 2012/0239142 A1 | 9/2012 | Liu et al. |
| 2013/0030519 A1 | 1/2013 | Tran et al. |
| 2013/0317598 A1 | 11/2013 | Rowe et al. |
| 2014/0094835 A1 | 4/2014 | Riles et al. |
| 2014/0100445 A1 | 4/2014 | Stenzel et al. |
| 2014/0296962 A1 | 10/2014 | Cartledge et al. |
| 2016/0206853 A1 | 7/2016 | Bolduc et al. |
| 2016/0279386 A1* | 9/2016 | Dale ................ A61M 25/0133 |
| 2017/0065415 A1 | 3/2017 | Rupp et al. |
| 2018/0001058 A1 | 1/2018 | Schlesinger |
| 2018/0028786 A1* | 2/2018 | Jungles ............. A61M 25/0147 |
| 2018/0098850 A1 | 4/2018 | Rafiee et al. |
| 2018/0153689 A1 | 6/2018 | Maimon et al. |
| 2018/0344456 A1 | 12/2018 | Barash et al. |
| 2019/0015205 A1 | 1/2019 | Rajagopal et al. |

FOREIGN PATENT DOCUMENTS

| | | |
|---|---|---|
| CN | 203507292 U | 4/2014 |
| CN | 203663213 U | 6/2014 |
| CN | 104083214 A | 10/2014 |
| CN | 206762020 U | 12/2017 |
| CN | 108785830 A | 11/2018 |
| DE | 19532846 A1 | 3/1997 |
| DE | 19907646 A1 | 8/2000 |
| EP | 0592410 B1 | 10/1995 |
| EP | 0850607 A1 | 7/1998 |
| FR | 2815844 A1 | 5/2002 |
| JP | S59194117 A | 11/1984 |
| JP | H06105798 A | 4/1994 |
| JP | 2008038968 A | 2/2008 |
| JP | 2016053529 A | 4/2016 |
| WO | 1991017720 A1 | 11/1991 |
| WO | 1998029057 A1 | 7/1998 |
| WO | 1999012483 A1 | 3/1999 |
| WO | 2001049213 A2 | 7/2001 |
| WO | 2001054625 A1 | 8/2001 |
| WO | 2001076510 A2 | 10/2001 |
| WO | 2002022054 A1 | 3/2002 |
| WO | 2002036048 A1 | 5/2002 |
| WO | 2002047575 A2 | 6/2002 |
| WO | 2002060352 A1 | 8/2002 |
| WO | 2003030776 A2 | 4/2003 |
| WO | 2003047468 A1 | 6/2003 |
| WO | 2004019825 A1 | 3/2004 |
| WO | 2005084595 A1 | 9/2005 |
| WO | 2005102015 A2 | 11/2005 |
| WO | 2006032051 A2 | 3/2006 |
| WO | 2006111391 A1 | 10/2006 |
| WO | 2006138173 A2 | 12/2006 |
| WO | 2007047488 A2 | 4/2007 |
| WO | 2007067942 A1 | 6/2007 |
| WO | 2010121076 A2 | 10/2010 |

\* cited by examiner

MANUFACTURE OF STEERABLE DELIVERY DEVICES

CROSS-REFERENCE TO RELATED APPLICATION

This application claims priority to International Patent Application Serial No. PCT/US2020/016935, filed Feb. 6, 2020 and entitled ADJUSTMENT MECHANISM! AND METHOD FOR A GUIDE WIRE, which claims priority to U.S. Provisional Patent Application Ser. No. 62/809,894, filed Feb. 25, 2019 and entitled MANUFACTURE OF STEERABLE DELIVERY DEVICES, the disclosures of both of which are incorporated by reference herein in their entireties for all purposes.

BACKGROUND

Field

The present disclosure generally relates to manufacturing delivery devices typically used in surgical procedures, such as catheters, with one or more pull wires to steer the device.

Description of Related Art

Delivery devices generally used in surgical procedures (e.g., catheters) can include one or more pull wires to help steer the device. Typically, the delivery device employs a pull wire having a distal end fixedly secured to the steerable section and a proximal end operatively connected to an adjustment mechanism located on a handle of the delivery device outside the body. The pull wire is typically disposed in a pull-wire lumen that extends longitudinally in or adjacent to a wall of the delivery device (e.g., a sheath or catheter). Adjusting the adjustment mechanism (e.g., rotating a knob), applies a pulling force on the pull wire, which in turn causes the steerable section to bend.

SUMMARY

According to a first aspect, an adjustment mechanism is disclosed that includes a wrapping set screw having a threaded portion, the wrapping set screw forming a lumen for a pull wire, a notch at a proximal end of the wrapping set screw through which the pull wire can be pulled, and a socket for a driving tool at the proximal end of the wrapping set screw. The adjustment mechanism also includes a wire wrap housing having a wrapping set screw lumen that is at least partially threaded to receive the wrapping set screw, the pull wire secured in place based at least in part on the pull wire lying between threads of the wrapping set screw lumen and roots of the threaded portion of the wrapping set screw with the wrapping set screw at least partially driven into the wire wrap housing.

In some embodiments of the first aspect, the wrapping set screw forms two or more notches. In some embodiments of the first aspect, the wrapping set screw includes a head portion that forms the socket. In some embodiments of the first aspect, the wire wrap housing further forms a catheter lumen that is larger than the wrapping set screw lumen, the catheter lumen configured to fit over a shaft of a steerable delivery device. In some embodiments of the first aspect, the threaded portion of the wrapping set screw extends from a distal end of the wrapping set screw to the proximal end of the wrapping set screw. In some embodiments of the first aspect, the notch extends distally from the proximal end of the wrapping set screw into the threaded portion of the wrapping set screw. In some embodiments of the first aspect, the wrapping set screw lumen is formed with a first portion that is threaded and a second portion that has an inner radius that is less than an inner radius of the first portion. In some embodiments of the first aspect, the socket comprises a hexagonal socket.

In some embodiments of the first aspect, the adjustment mechanism further includes an alignment guide configured to aid in aligning the pull wire with the wire wrap housing and the wrapping set screw. In further embodiments, the alignment guide includes a threaded portion abutting the wire wrap housing.

According to a number of implementations, a steerable catheter is disclosed that includes a shaft, a handle coupled to the shaft, and the adjustment mechanism of the first aspect.

In a second aspect, a wrapping set screw for securing a pull wire to an adjustment mechanism of a steerable delivery device is disclosed. The wrapping set screw includes a proximal end and a distal end, with a lumen formed longitudinally between the proximal end and the distal end, the lumen configured to allow a pull wire to be passed therethrough; a threaded portion extending proximally from the distal end; a notch portion formed at the proximal end, the notch portion extending distally from the proximal end into the threaded portion; and a socket portion formed by the proximal end, the socket portion configured to be compatible with a driving tool.

In some embodiments of the second aspect, the notch portion forms two notches. In some embodiments of the second aspect, the notch portion forms four notches.

In some embodiments of the second aspect, the wrapping set screw further includes a head portion at the proximal end such that the head portion includes the socket portion. In further embodiments, the notch portion extends distally beyond the head portion.

In some embodiments of the second aspect, the threaded portion extends from the distal end to the proximal end. In some embodiments of the second aspect, the threaded portion does not extend to the proximal end and the notch portion forms a notch that extends distally into the threaded portion. In some embodiments of the second aspect, the socket portion is configured to be compatible with a hex key. In some embodiments of the second aspect, the lumen extends from the distal end to a distal end of the socket portion formed by the proximal end.

In a third aspect, a method is provided for anchoring a pull wire to an adjustment mechanism using a wrapping set screw. The method includes guiding the pull wire through a threaded lumen of a wire wrap housing; guiding the pull wire through a lumen of the wrapping set screw; bending the pull wire through a notch at a proximal end of the wrapping set screw; rotating the pull wire to lie along a root of a threaded portion of the wrapping set screw; and driving the wrapping set screw into a threaded lumen of the wire wrap housing, wherein a portion of the pull wire lying along the root of the wrapping set screw is within a threaded portion of the threaded lumen.

In some embodiments of the third aspect, driving the wrapping set screw includes rotating the wrapping set screw less than one time.

In some embodiments of the third aspect, driving the wrapping set screw includes using a tool that fits within a socket formed at a proximal end of the wrapping set screw. In further embodiments, the tool includes a hex key.

In some embodiments of the third aspect, the wrapping set screw includes a head portion that is unthreaded. In some embodiments of the third aspect, the wrapping set screw is threaded along its entire length.

In some embodiments of the third aspect, the method further includes guiding a second pull wire through the threaded lumen of the wire wrap housing; and guiding the second pull wire through the lumen of the wrapping set screw. In further embodiments, the method further includes bending the second pull wire through a second notch at the proximal end of the wrapping set screw. In further embodiments, the method further includes rotating the second pull wire to lie along the root of the wrapping set screw. In further embodiments, the method further includes a portion of the second pull wire lying along the root of the wrapping set screw is within the threaded portion of the threaded lumen with the wrapping set screw driven into the threaded lumen of the wire wrap housing. In further embodiments, the method further includes bending the second pull wire through the notch at the proximal end of the wrapping set screw.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DETAILED DESCRIPTION OF SOME EMBODIMENTS

The headings provided herein are for convenience only and do not necessarily affect the scope or meaning of the claimed embodiments.
Overview
Delivery devices for use in surgical procedures (e.g., catheters) can be configured to be steerable using one or more pull wires, examples of which are described in U.S. Pub. No. 2016/0158497, which is incorporated by reference herein in its entirety. Such delivery devices can be used where it is beneficial or advantageous to steer the device during a procedure. The one or more pull wires are typically secured to a distal end of the delivery device (e.g., a steerable section) and to an adjustment mechanism at a proximal end. Manipulating the adjustment mechanism allows an operator to steer the delivery device by applying a force on the pull wire (e.g., pulling and/or pushing), which in turn causes the steerable section to bend or to straighten.

Assembling a catheter or other delivery device with one or more pull wires can be challenging due at least in part to difficulties in securing the pull wires to the adjustment mechanism for proper functionality. Assembly typically includes a process called wire wrapping, where a proximal end of the pull wire is wrapped around an anchor to secure it to the adjustment mechanism. Wire wrapping typically requires a skilled and well-trained operator to create multiple loops around a small component, such as a piece of metal, to secure the wire to the adjustment mechanism. After wire wrapping is completed, the assembly of the pull wires is typically inspected. This inspection may also present challenges because the loops of the wire can be difficult to discern when secured to the anchor and it may also be difficult to determine whether the wire is sufficiently secured to the anchor.

Accordingly, to address these and other challenges, described herein are devices, mechanisms, and methods for securing a pull wire to an adjustment mechanism. In particular, the disclosed devices, mechanisms and methods facilitate securing the pull wire by using a wrapping set screw that forms a lumen for the pull wire and that forms one or more notches in the side of the wrapping set screw at its proximal end. The lumen allows the pull wire to pass through the wrapping set screw and the one or more notches allow the pull wire to be pulled through a notch so that when the wrapping set screw is turned the pull wire lays within the roots of the screw. The roots of the screw refer to the troughs between the crests of the threads. The pull wire is secured in place due at least in part to being pressed between the screw and a threaded interior portion of a wrap housing and/or due at least in part to the friction between the pull wire and the screw. The wrap housing can be part of the adjustment mechanism that secures the pull wire to steer the delivery device. The wrapping set screws disclosed herein can be used with any metal or non-metal pull wire.

The disclosed devices, mechanisms, and methods advantageously facilitate anchoring a pull wire of a steerable delivery device to an adjustment mechanism. For example, an operator or manufacturer does not require as much skill to anchor the pull wire to the adjustment mechanism because the pull wire can be simply directed through a lumen of the wrapping set screw, pulled through a notch in the wrapping set screw, and then screwed into the housing. This process may be easier for operators to perform relative to methods that require multiple wraps of the pull wire around an anchor point and/or welding the pull wire to the anchor point. This also reduces the dependency between the resulting quality of the manufactured device and the skill of the operator. That is, typically the quality of the device is related to the skill of the operator. However, the disclosed mechanisms and methods allow a relatively unskilled operator to manufacture a high-quality device. This also improves or increases consistency between manufactured devices, making manufacturing more reliable, controllable, and repeatable. With increased consistency, variations in the behavior of steerable delivery devices are consequently reduced, ultimately improving patient outcomes in procedures that use such devices. Furthermore, the disclosed devices, mechanisms, and methods advantageously facilitate inspection of manufactured delivery devices. Relative to manufacturing methods that utilize welds and/or loops around a small component, it is easier to determine that a pull wire is properly anchored using the disclosed mechanisms and methods because it is more readily apparent whether the pull wire is pulled within and anchored to the wire wrap housing. This may be easier to inspect relative to methods that require multiple wraps of the pull wire around an anchor point and/or welding the pull wire to the anchor point because the inspector does not need to count the number of wraps around the anchor point and/or to inspect the efficacy of the weld at the anchor point.

Figure 1:
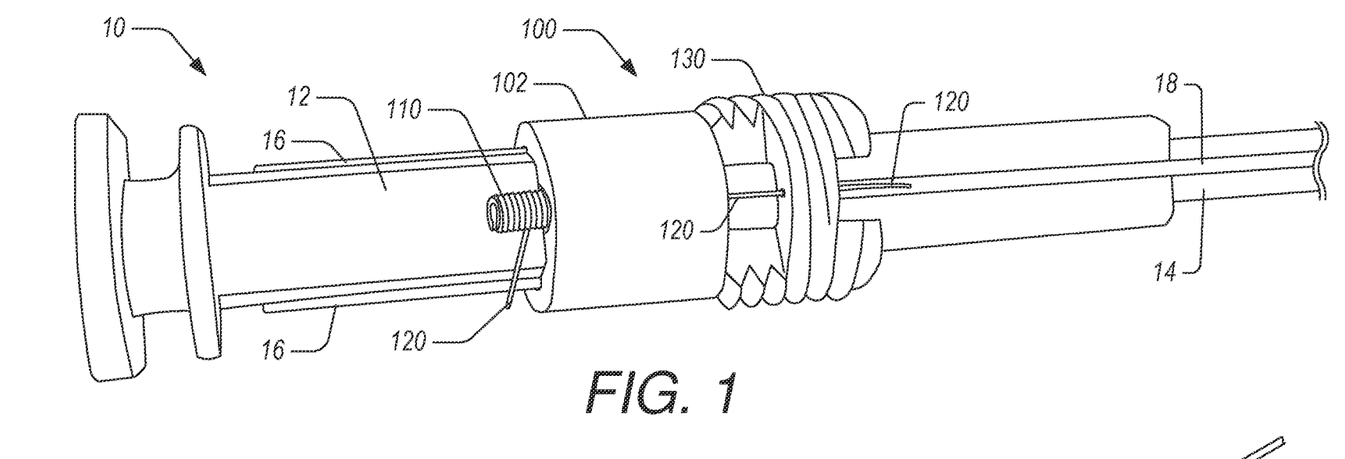
FIG. 1 illustrates a steerable delivery device having a pull wire secured to an adjustment mechanism using a wrapping set screw.

FIG. 1 illustrates a proximal portion of a steerable delivery device 10 (e.g., a catheter device) having a pull wire 120 anchored to an adjustment mechanism 100 using a wrapping set screw 110 secured to a wire wrap housing 102. The delivery device 10 can include a handle 12 and a shaft 14 extending distally therefrom. The pull wire 120 is configured to control a curvature of a distal portion of the shaft 14 (the distal portion of the shaft 14 not shown). The pull wire 120 extends through a peripheral pull-wire lumen 18 formed in an outer portion of the wall of the shaft 14.

The pull wire 120 has a proximal end portion operatively connected to an adjustment mechanism 100 at the wire wrap housing 102. In some embodiments, the adjustment mechanism 100 can include elements for manipulation by a user of the device such as, for example and without limitation, a rotatable knob mounted on the handle 12. The adjustment mechanism 100 is configured to change the relative distance between the distal end of the shaft 14 and the anchor point of the pull wire 120 on the handle 12. This change in distance causes the curvature of the distal portion of the shaft 14 to change because the length of the shaft 14 remains unchanged while the length of the pull wire 120 relative to the shaft 14 changes (which is connected to the distal end of the shaft 14). This change in relative length results in a change of the curvature of the distal end of the shaft 14. The distal portion of the shaft 14 can be constructed from a material that is relatively more flexible than the proximal portion of the shaft 14 or otherwise can be constructed to be relatively more flexible than the proximal portion such that the curvature of the proximal portion can remain substantially unchanged when the curvature of the distal portion is adjusted by adjusting the length of the pull wire 120 relative to the shaft 14. Further examples of shafts, handles, and adjustment mechanisms are described in U.S. Patent Publication Nos. 2013/0030519, 2009/0281619, 2008/0065011, and 2007/0005131, each of which is incorporated herein by reference in its entirety. It is to be understood that the wrapping set screws and wire wrap housings disclosed herein can be used in conjunction with any suitable delivery device, such as those described in the incorporated references.

The handle 12 can include guide rods 16 to guide the wire wrap housing 102 of the adjustment mechanism 100 proximally and distally along the handle 12. Proximal and distal movement of the wire wrap housing 102 causes the length of the pull wire 120 relative to the shaft 14 to decrease and increase due to the pull wire 120 being anchored to the wire wrap housing 102 using the wrapping set screw 110. The adjustment mechanism 100 can also include an alignment guide 130 configured to aid in aligning the pull wire 120 and to interface with the handle 12 and/or other components of the adjustment mechanism 100, such as components for manipulation by a user. The alignment guide 130 can be a threaded plastic portion abutting the wire wrap housing 102.

The shaft 14 can comprise a central lumen (not shown) that extends the length of the shaft 14. The central lumen, the diameter of which can be significantly larger than the diameter of the pull-wire lumen 18, can be used to transport one or more of a medical device, tools, medicament, or other substance. In some embodiments, the central lumen is used to transport a prosthetic heart valve. In some embodiments, the pull wire 120 can run along or within the central lumen.

To anchor the pull wire 120 to the adjustment mechanism 100, a wrapping set screw 110 is at least partially driven or screwed into the wire wrap housing 102 with a proximal portion of the pull wire 120 wrapped around the wrapping set screw 110 so that it lies along the roots (e.g., troughs) of the wrapping set screw 110. The wrapping set screw 110 includes a lumen through which the pull wire 120 is inserted and one or more notches that allow the pull wire 120 to be bent at a point that is distal to a proximal end of the wrapping set screw 110, as illustrated in FIG. 1. It should be understood that the wrapping set screw 110 is not limited to a set screw but can be any component that is at least partially threaded or that includes a series of annular rings and that forms a lumen for a pull wire 120 and that forms one or more notches at its proximal end.

In preparation for securing the pull wire 120 to the wire wrap housing 102, the wrapping set screw 110 is partially screwed into the wire wrap housing 102 such that the base of the notch (e.g., the distal end of the notch) is exposed. This allows a manufacturer to pull or to bend the pull wire 120 through the notch at the base of the notch, as illustrated in FIG. 1. With the pull wire 120 bent through the notch, the pull wire 120 can be rotated or wrapped around the wrapping set screw 110 so that the pull wire 120 lies along the roots of the wrapping set screw 110. Once the pull wire 110 is rotated around the wrapping set screw 110, screwing or driving the wrapping set screw 110 into a threaded lumen of the wire wrap housing 102 begins to draw the portion of the pull wire 120 lying along the roots of the wrapping set screw 110 within the wire wrap housing 102. The resulting friction and/or pressure on the pull wire 120 caused by the wire wrap housing 102 and the wrapping set screw 110 secures or anchors the pull wire 120 to the wire wrap housing 102. The pull wire 120 can be sufficiently secured in place using one or more turns or rotations or a fraction of a turn or rotation (e.g., a quarter turn, a half turn, three-quarters turn, etc.) of the wrapping set screw 110 when the base of the notch is approximately aligned with a proximal wall of the wire wrap housing 102.

In some embodiments, bending and rotating the pull wire 120 to lie along the roots of the wrapping set screw 110 secures the pull wire 120 in place. This may occur due at least in part to the friction between the portion of the pull wire 120 that is wrapped around the wrapping set screw 110 and the threaded portion of the wrapping set screw 110. In such embodiments, driving the wrapping set screw 110 into the wire wrap housing 102 further secures the pull wire 120 in place.

In some embodiments, the adjustment mechanism 100 can further include a wrapping nut (not shown) configured to be compatible with the wrapping set screw 110. In such embodiments, the wrapping nut can be rotated and screwed onto the wrapping set screw 110 to secure the pull wire 120 in place. The pull wire 120 can be secured in place due at least in part to the resulting friction and/or pressure on the pull wire 120 between the internal threads of the wrapping nut and the roots of the wrapping set screw 110. Similarly, the pull wire 120 can be secured in place due at least in part to the force or pressure on a portion of the pull wire 120 that does not lie in the roots of the wrapping set screw 110 but that is situated between a distal surface of the wrapping nut and a proximal surface of the wire wrap housing 102.

Example Adjustment Mechanisms

Figure 2A:
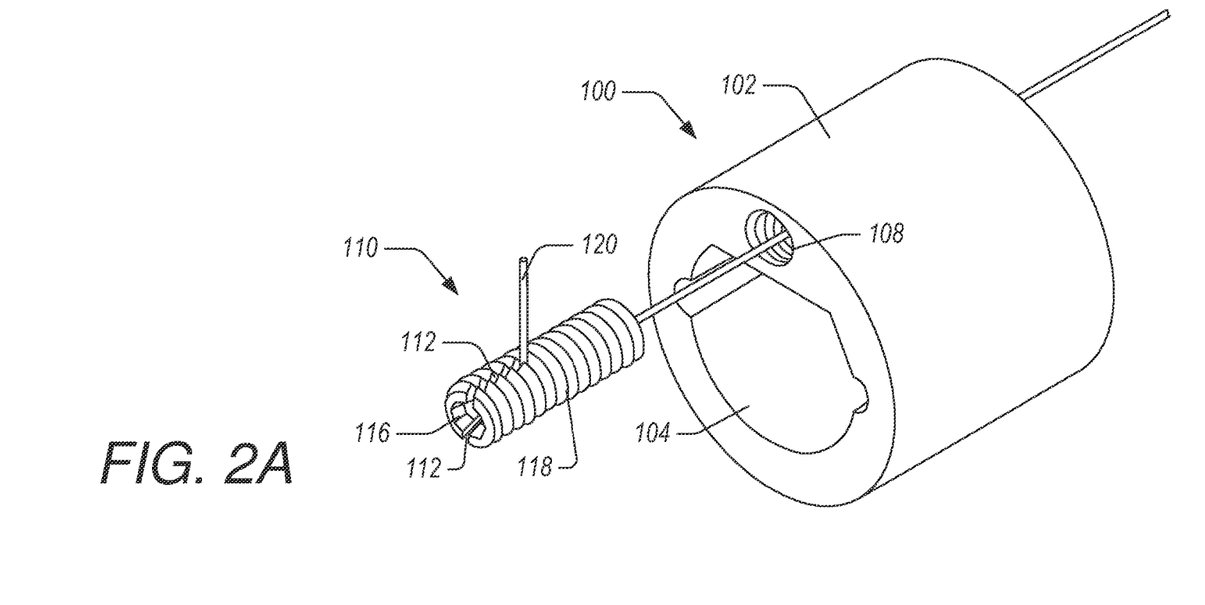
FIGS. 2A, 2B, and 2C illustrate various views of the wire wrap housing, the pull wire, and the wrapping set screw of the steerable delivery device of FIG. 1.
Figure 2B:
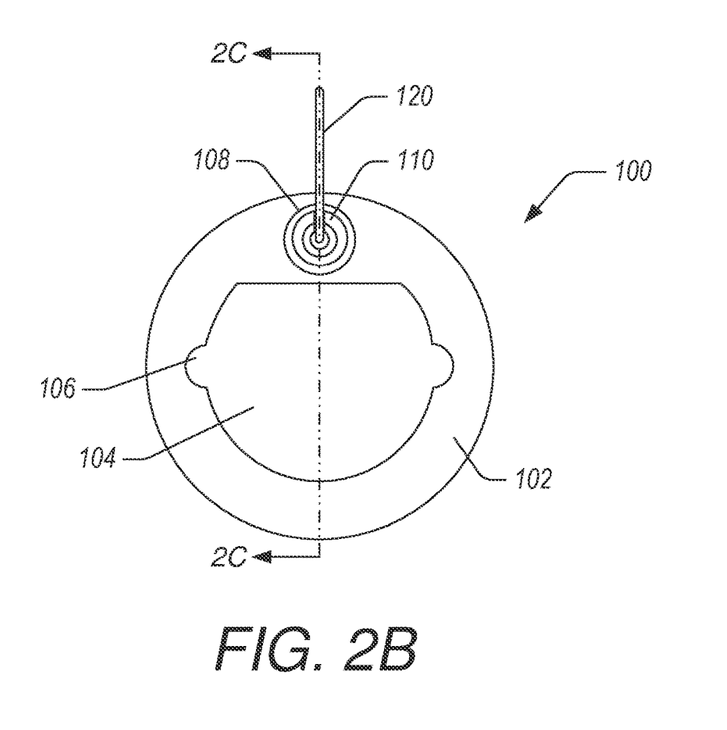
Figure 2C:
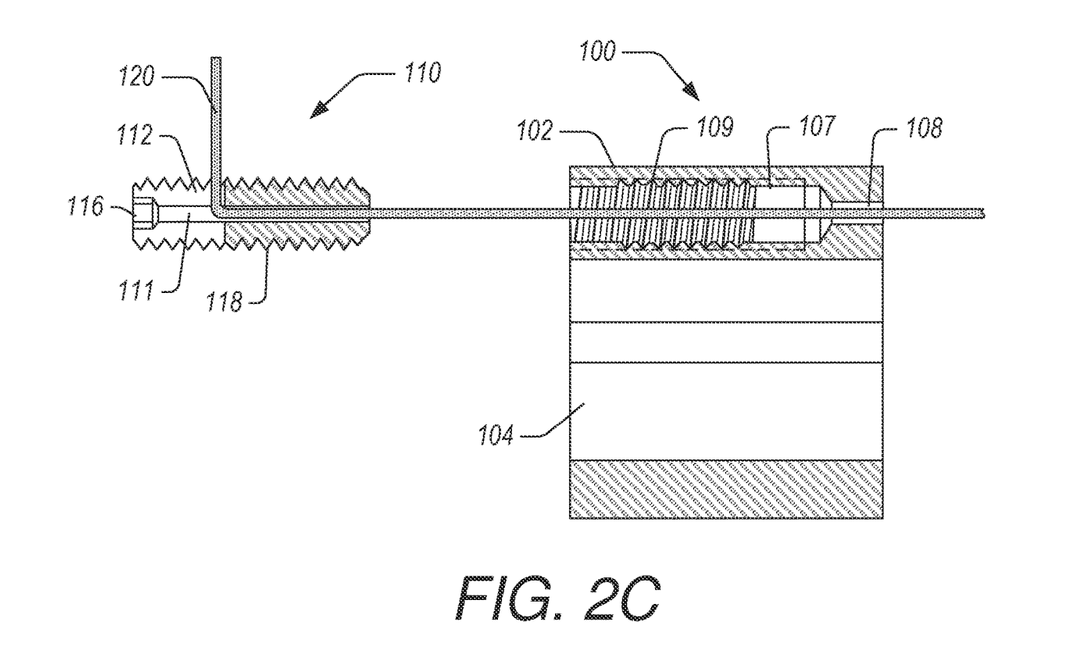

FIGS. 2A, 2B, and 2C illustrate various views of the wire wrap housing 102, the pull wire 120, and the wrapping set screw 110 of FIG. 1. FIG. 2A illustrates a perspective view of the adjustment mechanism 100 that includes the wire wrap housing 102, the wrapping set screw 110, and the pull wire 120. FIG. 2B illustrates an end view of the adjustment mechanism 100 and FIG. 2C illustrates a cross-section view of the adjustment mechanism 100 with the cross-section indicated in FIG. 2B. The following description refers interchangeably to FIGS. 2A-2C.

The adjustment mechanism 100 includes a wrapping set screw 110 having a lumen 111 for the pull wire 120. The wrapping set screw 110 also includes two notches 112 at a proximal end of the wrapping set screw 110 through which the pull wire 120 can be pulled, bent, or angled. The wrapping set screw 110 can include one notch, two notches, three notches, four notches, or more than four notches. The wrapping set screw 110 forms a socket 116 for a driving tool at the proximal end of the wrapping set screw 110. The socket 116 can be made to be compatible with a particular class of driving tools (e.g., hex keys).

The wrapping set screw 110 includes a threaded portion 118 that may run the entire length of the wrapping set screw 110 or it can make up a portion of the length of the wrapping set screw 110. The threaded portion 118 includes crests and roots (or troughs) and the pull wire 120 is configured to lie along the roots of the threaded portion 118. As illustrated, the pull wire 120 is pulled or passed through the lumen 111 of the wrapping set screw 110 and bent through one of the two notches 112. To anchor the pull wire 120 to the adjustment mechanism, the pull wire 120 is wrapped around the wrapping set screw 110 so that it lies along the roots of the threaded portion 118, which is described in greater detail herein with reference to FIG. 3. The pull wire 120 can be metal, non-metal, or a combination of metals and non-metals.

The adjustment mechanism 100 also includes a wire wrap housing 102 forming a wrapping set screw lumen 108 that is at least partially threaded 109 to receive the wrapping set screw 110. The pull wire 120 is secured in place to the adjustment mechanism 100 based at least in part on the pull wire 120 lying between the threads 109 of the lumen 108 and the roots of the threaded portion 118 of the wrapping set screw 110 when the wrapping set screw 110 is at least partially screwed or driven into the wire wrap housing 102.

The wire wrap housing 102 also forms a handle lumen 104 through which the handle 12 of the delivery device 10 can be passed or inserted. In some embodiments, the handle lumen 104 can be a shaft lumen through which the shaft 14 of the delivery device can be passed or inserted. The wire wrap housing 102 can also form guide rail features 106 to conform to guide rails 16 or other features designed to guide movement of the wire wrap housing 102 when the adjustment mechanism 100 moves relative to a shaft 14 of the associated delivery device 10.

As best illustrated in the cross-section view of FIG. 2C, the wrapping set screw 110 includes a lumen 111 and two notches 112 with a portion of the pull wire 120 positioned within the lumen 111 of the wrapping set screw 110 (the horizontal portion of the pull wire 120) and a portion of the pull wire 120 pulled through a notch 112 in the wrapping set screw 110 (the vertical portion of the pull wire 120). The cross-section also illustrates the hexagonal socket 116 formed at a proximal end of the wrapping set screw 110. The hexagonal socket 116 allows an operator or manufacturer to use a hex key or Allen wrench (or other suitable tool for different socket configurations) to rotate the wrapping set screw 110 to screw it into the wire wrap housing 102. In some embodiments, the distal end of the notches 112 are more distal than a distal surface of the socket 116. In such embodiments, the pull wire 112 is untouched by the driving tool (e.g., the hex key) because the pull wire 120 is pulled or angled through the notch 112 in the wrapping set screw 110 below the distal surface of the socket 116. This reduces or eliminates damage to the pull wire 120 that may be caused by the driving tool.

The wrapping set screw lumen 108 of the wire wrap housing 102 can include a threaded portion 109 and an unthreaded portion 107. In some embodiments, the unthreaded portion 107 can have a smaller radius than the threaded portion 108 to allow the pull wire 120 to pass through while also limiting the insertion distance of the wrapping set screw 110. In a similar fashion, the unthreaded portion 107 of the lumen 108 can have the same or similar radius as the threaded portion 109 while also being configured to limit the insertion distance of the wrapping set screw 110 by limiting the length of the threaded portion 109.

Figure 3:
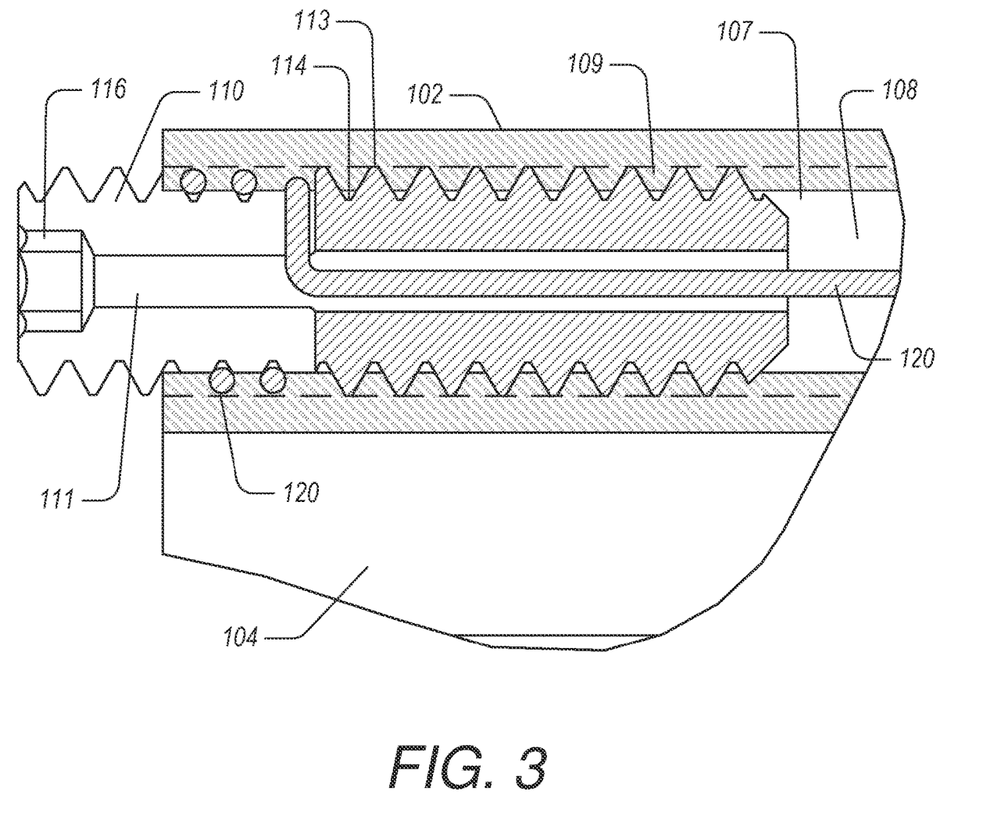
FIG. 3 illustrates a cross-section view of the pull wire secured to the wire wrap housing using the wrapping set screw of FIG. 1.

FIG. 3 illustrates a cross-section view of the pull wire 120 in a configuration where it is secured to the wire wrap housing 102 using the wrapping set screw 110 of FIG. 1. The pull wire 120 can be fixed in place when the wrapping set screw 110 is threaded into the lumen 108 of the wire wrap housing 102. To anchor the pull wire 120 to the adjustment mechanism 100, the pull wire 120 is passed through a portion of the lumen 111 of the wrapping set screw 110, bent through a notch 112 of the wrapping set screw 110, and wrapped around the wrapping set screw 110 in such a way that a portion of the pull wire 120 lies along the roots 114 (or between the crests 113) of the threaded portion 118 of the wrapping set screw 110. With the pull wire 120 prepared in this way, the wrapping set screw 110 can be driven into the threaded portion 109 of the wrapping set screw lumen 108 formed by the wire wrap housing 102.

The mechanism for securing or fixing the pull wire 120 in place may include the pressure of the threads of the threaded lumen 109 and the roots 114 of the wrapping set screw 110 on the pull wire 120. The mechanism for securing or fixing the pull wire in place may include the friction between the pull wire 120 and the wrapping set screw 110. FIG. 3 illustrates the pull wire 120 secured in place after the wrapping set screw 110 has been rotated and screwed at least partially into the wire wrap housing 102. The pull wire 120 lies along the roots 114 of the wrapping set screw 110 and experiences a force from the threaded portion 109 of the wire wrap housing 102 to help secure the pull wire 120 in place.

It should be noted that although a single pull wire is illustrated in each of FIGS. 1-3, it is to be understood that multiple pull wires may be secured to the adjustment mechanism 100 using the devices, components, and methods described herein. In some embodiments, a wrapping set screw with multiple notches can be used to secure multiple pull wires. For example, a first pull wire can be bent through a first notch, a second pull wire can be bent through a second notch, and both pull wires can be secured to the adjustment mechanism by turning, driving, or rotating the wrapping set screw so that at least a portion of the individual pull wires is within a threaded portion of the wire wrap housing. In general, the wrapping set screws disclosed herein may include a plurality of notches with individual notches being used to secure different pull wires to the adjustment mechanism 100 using the methods described herein. As another example, the wrapping set screw 110 can include a single notch and a plurality of pull wires can be bent through that single notch and anchored to the adjustment mechanism 100 using the methods described herein. As yet another example, the wrapping set screw 110 can include a plurality of notches where a first notch is used to anchor a single pull wire and a second notch is used to anchor a plurality of pull wires to the adjustment mechanism 100 using the methods described herein. In other words, it is not necessary for every notch in the wrapping set screw to receive a pull wire and/or it is not necessary to restrict the use of a notch for a single pull wire; there may be notches that are unused and/or there may be notches that receive one or more pull wires.

Example Wrapping Set Screws

The wrapping set screws disclosed herein can have a variety of configurations, examples of which are illustrated in FIGS. 4A-4C and 5A-5C. Although each of these examples includes a hexagonal socket, it is to be understood that different configurations are possible such as wrapping set screws with sockets for different driving tools such as slot, cross, Phillips, Torx, etc. Furthermore, although examples are shown with four notches (FIGS. 4A-4C) and one notch (FIGS. 5A-5C), any suitable number of notches can be used. In addition, the number of notches and/or the socket configuration are not necessarily tied to wrapping set screws that are threaded along their entire length (e.g., the wrapping set screw of FIGS. 4A-4C) or that are partially threaded (e.g., the wrapping set screw of FIGS. 5A-5C). In other words, the number of notches, the socket configuration, and the extent of the threading are independently configurable for wrapping set screws. Moreover, the number of notches and/or the socket configuration are also independently configurable for wrapping set screws that do not include a head portion (e.g., the wrapping set screw of FIGS. 4A-4C) or that include a head portion (e.g., the wrapping set screw of FIGS. 5A-5C).

Figure 4A:
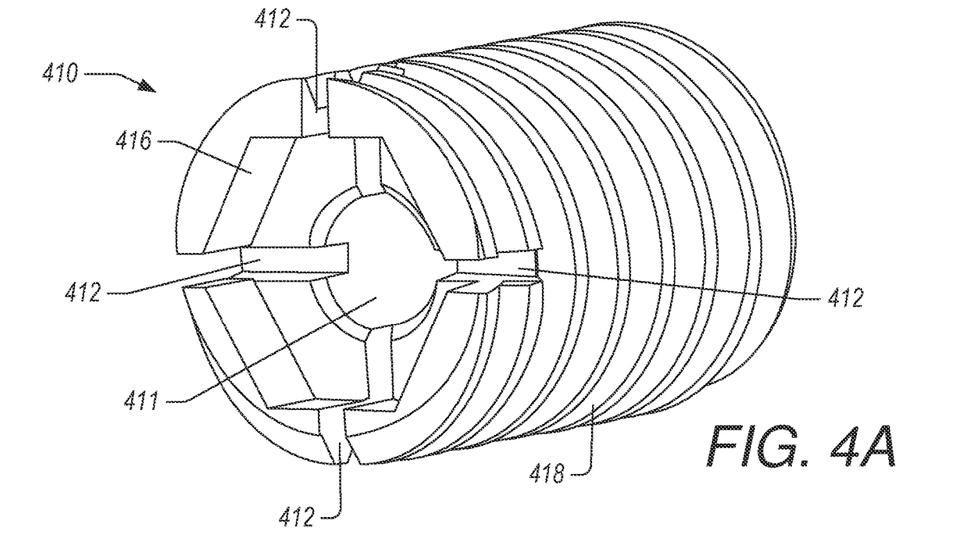
FIGS. 4A, 4B, and 4C illustrate an example of a wrapping set screw.
Figures 4B, 4C:
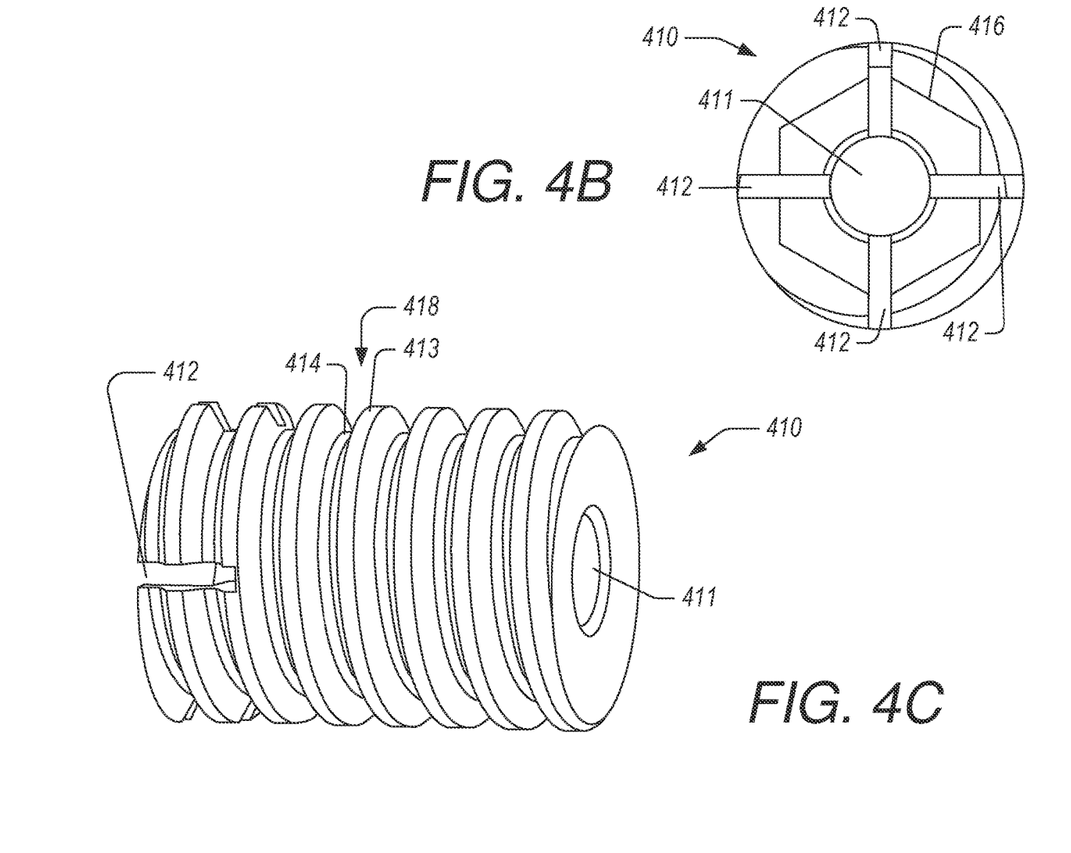

FIGS. 4A, 4B, and 4C illustrate an example of a wrapping set screw 410. The wrapping set screw 410 forms a lumen 411 through which a pull wire can be guided, pulled, or passed. The proximal end of the wrapping set screw 410 forms a hexagonal socket 416 to receive a hex key or Allen key. The wrapping set screw 410 also forms four notches 412. Each notch 412 extends a portion of the length from a proximal end of the wrapping set screw 410. Each notch 412 provides a path from the lumen 411 to an external, threaded portion 418 of the wrapping set screw 410. Each notch 412 is configured to allow a pull wire to be bent to exit the lumen 411 without reaching the proximal end of the wrapping set screw 410. Each notch 412 also is configured to allow a pull wire to be rotated after being bent so that the pull wire lies along the roots 414 (or between the crests 413) of the threaded portion 418 of the wrapping set screw 410.

The wrapping set screw 410 is threaded along its entire length from a distal end to the proximal end. However, in some embodiments, the wrapping set screw 410 is threaded only partially along its length, starting at the distal end and ending before the proximal end of the wrapping set screw 410. In certain embodiments, the threaded portion 418 extends proximally past a base (or a distal end) of the notches 412 to allow the bent and rotated pull wire to lie along the roots 414 of the threaded portion 418. In various embodiments, the threaded portion 418 does not extend proximally past a base (or a distal end) of the notches 412 and the pull wire is pulled distally prior to being rotated to allow the pull wire to lie along the roots 414 of the threaded portion 418.

Figure 5A:
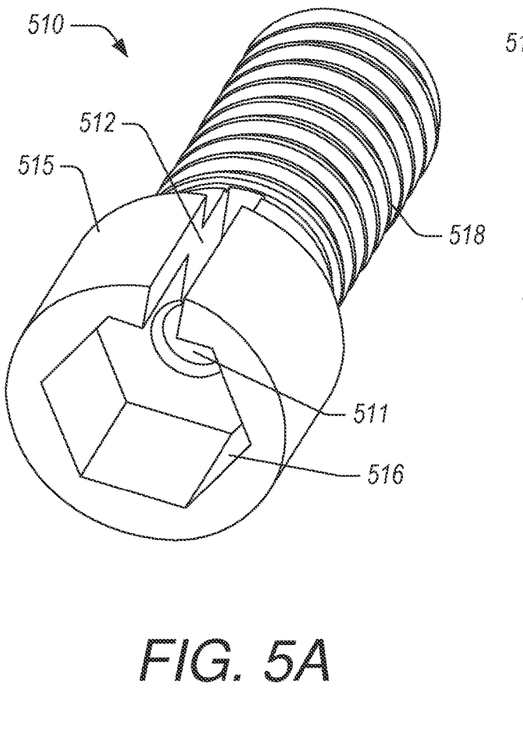
FIGS. 5A, 5B, and 5C illustrate another example of a wrapping set screw.
Figure 5B:
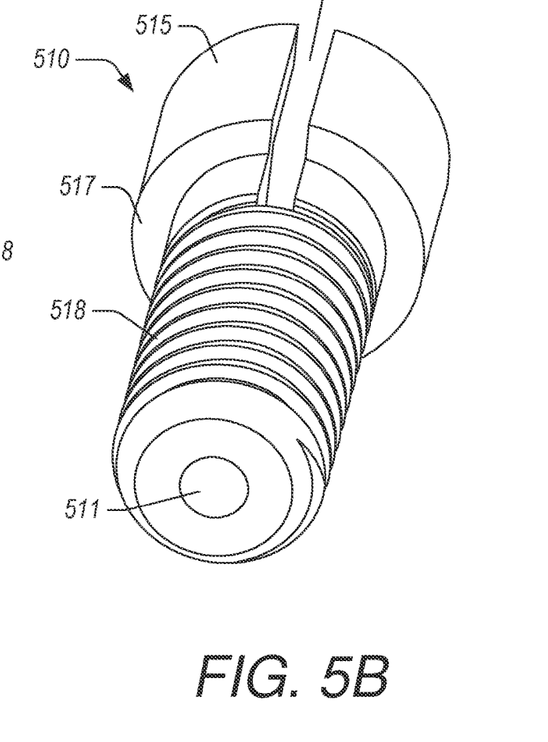
Figure 5C:
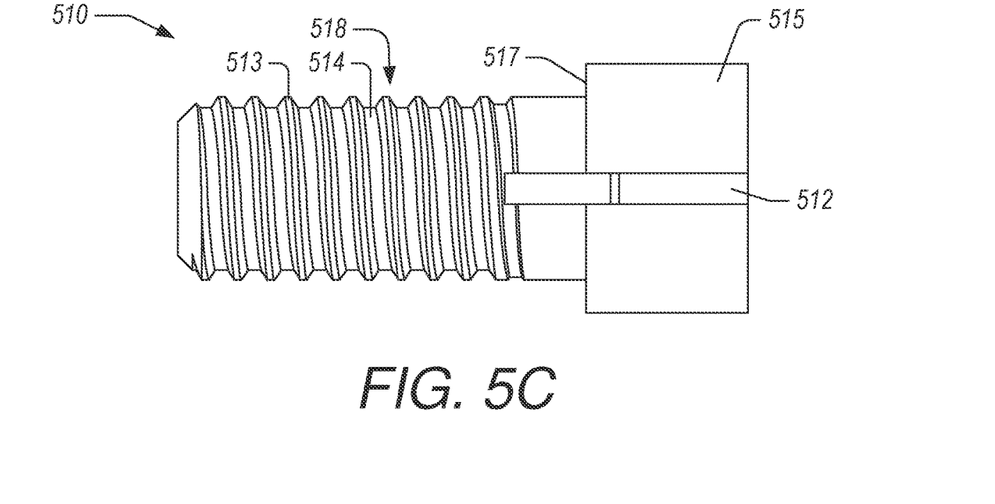

FIGS. 5A, 5B, and 5C illustrate another example of a wrapping set screw 510. The wrapping set screw 510 forms a lumen 511 through which a pull wire can be guided, pulled, or passed. The proximal end of the wrapping set screw 510 includes a head 515 that forms a hexagonal socket 516 to receive a hex key or Allen key. The head 515 has a larger diameter than a distal shaft that includes a threaded portion 518 of the wrapping set screw 510. The head 515 forms a distal surface 517 as a transition from the head portion 515 to the distal shaft with the threaded portion 518. The wrapping set screw 510 also forms a notch 512. The notch 512 extends from the proximal end of the head portion 515 at least a portion of the length of the distal shaft. In some embodiments, the notch extends into the threaded portion 518. The notch 512 provides a path from the lumen 511 to the threaded portion 518 of the wrapping set screw 510. The notch 512 is configured to allow a pull wire to be bent to exit the lumen 511 without reaching the head portion 515 of the wrapping set screw 510. The notch 512 also is configured to allow a pull wire to be rotated after being bent so that the pull wire lies along the roots 514 (or between the crests 513) of the threaded portion 518. In some embodiments, the threaded portion 518 extends proximally past a base (or a distal end) of the notch 512 to allow the bent and rotated pull wire to lie within the roots 514 of the threaded portion 518. In various embodiments, the threaded portion 518 does not extend proximally past a base (or a distal end) of the notch 512 and the pull wire is pulled distally prior to being rotated to allow the pull wire to lie along the roots 514 of the threaded portion 518.

The wrapping set screw 510 is threaded along a portion of its length, ending prior to the head portion 515. However, in some embodiments, the wrapping set screw 510 is threaded along the entire length of the distal shaft from the distal end to the distal surface 517 of the head portion 515.

The wrapping set screw 510 can provide an additional or alternative mechanism for securing a pull wire to a wire wrap housing compared to the wrapping set screw 410 described with reference to FIGS. 4A-4C. In addition to or as an alternative to the pressure and friction between the threaded portion of the wrapping set screw lumen and the roots 514 of the threaded portion 518 of the wrapping set screw 510, the pull wire can be pinched between the distal surface 517 of the head portion 515 and a proximal face or surface of the wire wrap housing. By turning, driving, or rotating the wrapping set screw 510, the pressure between the distal surface 517 and the proximal face of the wire wrap housing can be increased to secure the pull wire in place.

Example Methods of Manufacture

Figure 6:
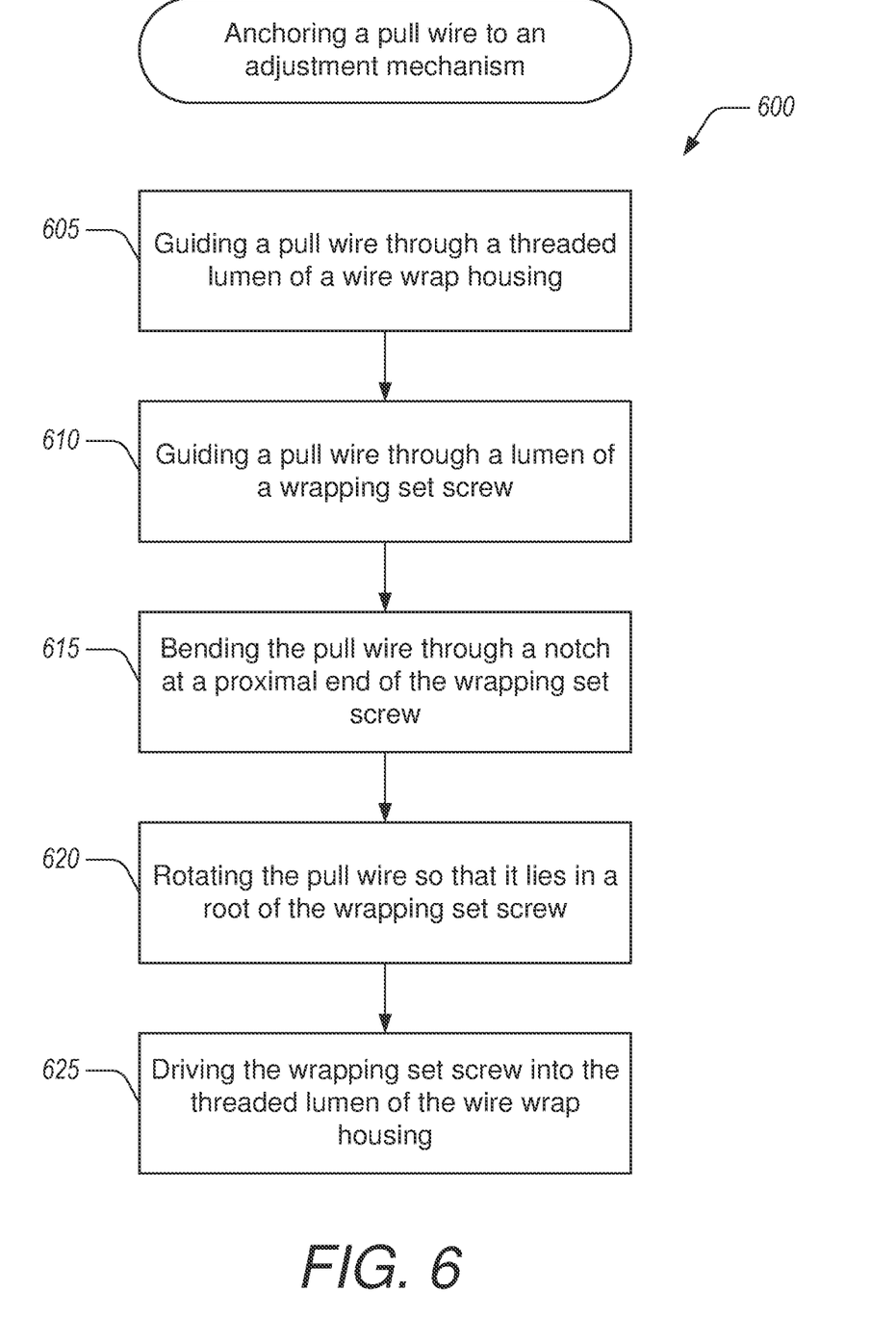
FIG. 6 is a flow chart for an example method for anchoring a pull wire to an adjustment mechanism using a wrapping set screw.

FIG. 6 illustrates a flow chart of an example method 600 for anchoring a pull wire to an adjustment mechanism using a wrapping set screw. The adjustment mechanism, the pull wire, and the wrapping set screw can be any of the corresponding components described herein with reference to FIGS. 1-5C or any suitable variations thereof. As described below, the adjustment mechanism includes a wrapping set screw and a wire wrap housing. The wrapping set screw includes a lumen and one or more notches. The wrapping set screw is configured to be driven or screwed into a threaded lumen of the wire wrap housing. The method 600 can be used as a portion of a larger process for manufacturing a steerable delivery device.

At block 605, a proximal end of a pull wire is guided or passed through a threaded lumen of a wire wrap housing. The pull wire can be metal or non-metal. In some embodiments, the pull wire can have a distal end that is attached to a distal end of a steerable catheter. The lumen of the wire wrap housing can include one or more inner radiuses. The lumen of the wire wrap housing can be at least partially threaded.

At block 610, the pull wire is guided or passed through a lumen of a wrapping set screw. The wrapping set screw can form a longitudinal lumen. The pull wire can be guided through the lumen from the distal end to the proximal end of the lumen. The proximal end of the lumen can be at a point that is more distal than a proximal end of the wrapping set screw. For example, where the wrapping set screw includes a head that forms a socket, the proximal end of the lumen be formed within the socket.

At block 615, the pull wire is bent through a notch at the proximal end of the wrapping set screw. The notch can extend from the proximal end partially to the distal end of the wrapping set screw. A base of the notch is formed at a point along the wrapping set screw so that the pull wire can be pulled from the lumen of the wrapping set screw and guided out of the notch. In some embodiments, an operator can use pliers or other implements to pull and to bend the pull wire. The pliers and/or other implements may also be used to clamp the pull wire in place during assembly.

At block 620, the pull wire is rotated or bent to lie along a root of the wrapping set screw. Rotation of the pull wire includes directing it to lie along an external threaded portion of the wrapping set screw. It is not necessary to wrap the entire proximal portion of the pull wire around the wrapping set screw. In some embodiments, it may be sufficient to bend the pull wire so that a relatively small portion lies within the roots of the wrapping set screw. In such instances, driving the wrapping set screw can further cause the proximal portion of the pull wire that is outside of the notch to lie along the roots of the wrapping set screw. In some embodiments, an operator can use pliers or other implements to rotate and/or bend the pull wire. The pliers and/or other implements may also be used to clamp the pull wire in place during assembly. In some embodiments, rotating the pull wire to at least partially lie along the roots of the wrapping set screw is sufficient to secure the pull wire in place. This may be due at least in part to the friction between the wrapping set screw and the portion of the pull wire that is bent out of the notch and rotated to lie within the roots of the threaded portion of the wrapping set screw.

At block 625, the wrapping set screw is driven into a threaded lumen of a wire wrap housing. In some embodiments, a portion of the pull wire lying in the root of the wrapping set screw contacts a threaded portion of the threaded lumen. In some embodiments, the friction and/or pressure on the pull wire caused by the threads of the threaded lumen and the roots of the wrapping set screw lock or secure the pull wire in place. The wrapping set screw can be driven into the threaded lumen sufficient to lock or to secure the pull wire in place so that operation of the adjustment mechanism does not cause the pull wire to slip. In some embodiments, to secure the pull wire to the adjustment mechanism the wrapping set screw can be turned or rotated one or more times or the wrapping set screw can be turned or rotated less than one time (e.g., a quarter turn, a half turn, three-quarters turn, or the like).

To secure a plurality of pull wires to an adjustment mechanism, the method 600 can be adjusted to bend individual pull wires through individual notches of the wrapping set screw. For example, a first pull wire can be pulled through a first notch of the wrapping set screw (e.g., using pliers) and clamped in place. Then, a second pull wire can be pulled through a second notch of the wrapping set screw and clamped in place. Then, the wrapping set screw can be driven into the wire wrap housing to anchor the first and second pull wires to the adjustment mechanism.

Similarly, to secure a plurality of pull wires to an adjustment mechanism, the method 600 can be adjusted to bend a plurality of pull wires through an individual notch of the wrapping set screw. For example, a first pull wire can be pulled through a first notch of the wrapping set screw (e.g., using pliers) and clamped in place. Then, a second pull wire can be pulled through the same notch of the wrapping set screw and clamped in place. Then, the wrapping set screw can be driven into the wire wrap housing to anchor the first and second pull wires to the adjustment mechanism.

Likewise, to secure a plurality of pull wires to an adjustment mechanism, the method 600 can be adjusted to bend a plurality of pull wires through a first notch of the wrapping set screw and to bend an individual pull wire through a second notch. For example, a first pull wire can be pulled through a first notch of the wrapping set screw (e.g., using pliers) and clamped in place. Then, a second pull wire can be pulled through the same notch of the wrapping set screw and clamped in place. Then, a third pull wire can be pulled through a second notch of the wrapping set screw and clamped in place. Then, the wrapping set screw can be driven into the wire wrap housing to anchor the first, second, and third pull wires to the adjustment mechanism.

Additional Embodiments and Terminology

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps or phases can be rearranged, and certain steps or phases may be omitted entirely. Also, the methods described herein are to be understood to be open-ended, such that additional steps and/or phases to those shown and described herein can also be performed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An adjustment mechanism comprising:
   a wrapping set screw having a threaded portion, the wrapping set screw forming a lumen for a pull wire, a notch at a proximal end of the wrapping set screw through which the pull wire can be pulled, and a socket for a driving tool at the proximal end of the wrapping set screw; and
   a wire wrap housing having a wrapping set screw lumen that is at least partially threaded to receive the wrapping set screw, the pull wire secured in place based at least in part on the pull wire lying between threads of the wrapping set screw lumen and roots of the threaded portion of the wrapping set screw with the wrapping set screw at least partially driven into the wire wrap housing such that a portion of the pull wire between the roots of the wrapping set screw and the threads of the wrapping set screw lumen experiences a force from the threads of the wrapping set screw lumen to secure the pull wire in place.

2. The adjustment mechanism of claim 1 wherein the wrapping set screw forms two or more notches.

3. The adjustment mechanism of claim 1 wherein the wrapping set screw includes a head portion that forms the socket.

4. The adjustment mechanism of claim 1 wherein the wire wrap housing further forms a catheter lumen that is larger than the wrapping set screw lumen, the catheter lumen configured to fit over a shaft of a steerable delivery device.

5. The adjustment mechanism of claim 1 wherein the threaded portion of the wrapping set screw extends from a distal end of the wrapping set screw to the proximal end of the wrapping set screw.

6. The adjustment mechanism of claim 1 wherein the notch extends distally from the proximal end of the wrapping set screw into the threaded portion of the wrapping set screw.

7. The adjustment mechanism of claim 1 wherein the wrapping set screw lumen is formed with a first portion that is threaded and a second portion that has an inner radius that is less than an inner radius of the first portion.

8. The adjustment mechanism of claim 1 wherein the socket comprises a hexagonal socket.

9. The adjustment mechanism of claim 1 further comprising an alignment guide configured to aid in aligning the pull wire with the wire wrap housing and the wrapping set screw.

10. The adjustment mechanism of claim 9 wherein the alignment guide comprises a threaded portion abutting the wire wrap housing.

11. A steerable catheter including a shaft, a handle coupled to the shaft, and the adjustment mechanism of claim 1 coupled to the handle.

12. A wrapping set screw for securing a pull wire to an adjustment mechanism of a steerable delivery device, the wrapping set screw comprising:
    a proximal end and a distal end, with a lumen formed longitudinally between the proximal end and the distal end, the lumen configured to allow a pull wire to be passed therethrough;
    a threaded portion extending proximally from the distal end;
    a notch portion formed at the proximal end, the notch portion extending distally from the proximal end into the threaded portion; and
    a socket portion formed by the proximal end, the socket portion configured to be compatible with a driving tool,
    wherein the notch portion is configured to allow a pull wire to be bent out of the notch prior to the proximal end and wrapped within roots of the threaded portion such that driving the wrapping set screw into a threaded lumen compatible with the threaded portion exerts a force on the pull wire from threads of the threaded lumen and roots of the threaded portion to secure the pull wire in place.

13. The wrapping set screw of claim 12 wherein the notch portion forms two notches.

14. The wrapping set screw of claim 12 wherein the notch portion forms four notches.

15. The wrapping set screw of claim 12 further comprising a head portion at the proximal end such that the head portion includes the socket portion.

16. The wrapping set screw of claim 15 wherein the notch portion extends distally beyond the head portion.

17. The wrapping set screw of claim 12 wherein the threaded portion extends from the distal end to the proximal end.

18. The wrapping set screw of claim 12 wherein the threaded portion does not extend to the proximal end and the notch portion forms a notch that extends distally into the threaded portion.

19. The wrapping set screw of claim 12 wherein the socket portion is configured to be compatible with a hex key.

20. The wrapping set screw of claim 12 wherein the lumen extends from the distal end to a distal end of the socket portion formed by the proximal end.

21. A method for anchoring a pull wire to an adjustment mechanism using a wrapping set screw, the method comprising:
    guiding the pull wire through a threaded lumen of a wire wrap housing;
    guiding the pull wire through a lumen of the wrapping set screw;
    bending the pull wire through a notch at a proximal end of the wrapping set screw;
    rotating the pull wire to lie along a root of a threaded portion of the wrapping set screw; and driving the wrapping set screw into a threaded lumen of the wire wrap housing, wherein a portion of the pull wire lying along the root of the wrapping set screw is between the root of the wrapping set screw and a threaded portion of the threaded lumen such that the portion of the pull wire between the root of the wrapping set screw and the threaded portion of the threaded lumen experiences a force from the threaded portion of the threaded lumen to secure the pull wire in place.

22. The method of claim 21 wherein driving the wrapping set screw includes rotating the wrapping set screw less than one time.

23. The method of claim 21 wherein driving the wrapping set screw includes using a tool that fits within a socket formed at a proximal end of the wrapping set screw.

24. The method of claim 23 wherein the tool includes a hex key.

25. The method of claim 21 wherein the wrapping set screw includes a head portion that is unthreaded.

26. The method of claim 21 wherein the wrapping set screw is threaded along its entire length.

27. The method of claim 21 further comprising:
guiding a second pull wire through the threaded lumen of the wire wrap housing; and
guiding the second pull wire through the lumen of the wrapping set screw.

28. The method of claim 27 further comprising bending the second pull wire through a second notch at the proximal end of the wrapping set screw.

29. The method of claim 28 further comprising rotating the second pull wire to lie along the root of the wrapping set screw.

30. The method of claim 29 wherein a portion of the second pull wire lying along the root of the wrapping set screw is within the threaded portion of the threaded lumen with the wrapping set screw driven into the threaded lumen of the wire wrap housing.

31. The method of claim 27 further comprising bending the second pull wire through the notch at the proximal end of the wrapping set screw.

* * * * *